May 12, 1942.    H. G. WOMMER    2,283,132
HONE
Filed Sept. 19, 1940
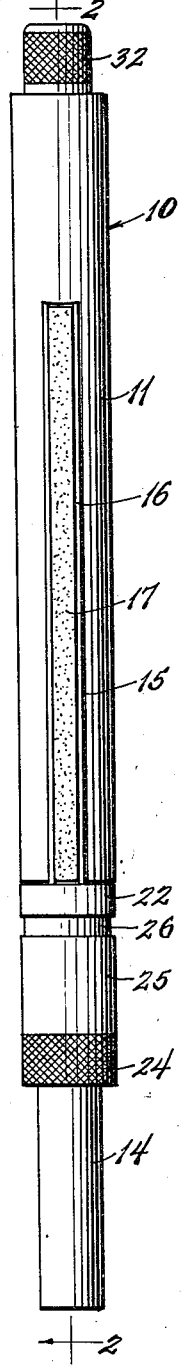
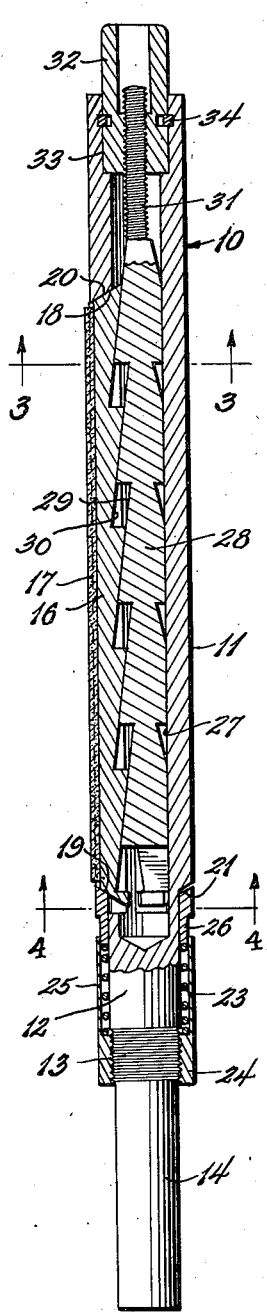
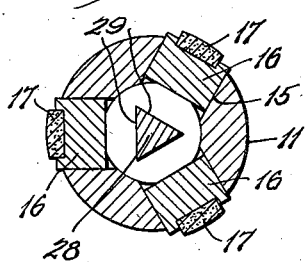
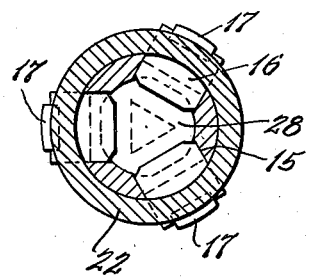
Inventor
H. G. Wommer
By A. D. Adams
Attorney Patented May 12, 1942

2,283,132

UNITED STATES PATENT OFFICE 2,283,132

HONE

Howard G. Wommer, Millersburg, Pa., assignor to Keystone Reamer & Tool Company, Millersburg, Pa., a corporation of Pennsylvania Application September 19, 1940, Serial No. 357,474

2 Claims. (Cl. 51—184.3)

This invention relates to hones or abrading tools and aims, among other objects, to provide an improved tool particularly adapted to hone wrist pin bearings, king bolt bearings, generator bearings and the like. Another object is to provide a tool of this type which is compact, simple and rugged having means readily adjustable to vary the effective diameter thereof.

Other aims and advantages of the invention will appear in the specification, when considered in connection with the accompanying drawing, wherein:

Fig. 1 is an elevation of a tool embodying the invention;

Fig. 2 is a longitudinal sectional view taken on the line 2—2 of Fig. 1; and

Figs. 3 and 4 are transverse sectional views taken on the lines 3—3 and 4—4 of Fig. 2, respectively.

Referring particularly to the drawing, the preferred embodiment of the invention is shown as comprising a cylindrical body 10 carrying a plurality of relatively long abrading stones and means at one end of the body for radially adjusting them to vary their effective diameter. The major portion 11 of the body is slightly smaller than the minimum diameter of the bearing to be honed. On one end of the major portion 11, there is a portion 12 of reduced diameter having screw threads 13 at its outer end. An integral extension 14 of further reduced diameter provides a shank for rotating the tool.

The body is shown as having three longitudinally extending radial slots or passageways 15 in which are slidably mounted stone holders or carriers 16, carrying abrading stones 17. The slots 15 extend from a point spaced from the outer end of the portion 11 to a point in the reduced portion 12.

The ends of each stone holder are beveled as at 18 and 19 and cooperate with an undercut or beveled shoulder 20 formed at the upper end of the slot 15 and with the undercut or beveled edge 21 of a sleeve 22 slidably mounted on the reduced portion 12 to confine the holders in their adjusted positions. The sleeve 22 is held in engagement with the ends 19 of the holders by a coiled compression spring 23 on the portion 12 between the sleeve and an adjustable knurled nut 24 on the screw threaded portion 13. The spring is shown as being shielded by a tubular extension 25 on the nut 24 extending over the reduced end 26 of the sleeve. The outside diameters of the portion 11, the extension 23 and nut 24, and the largest diameter of the sleeve 22 may all be the same for convenience of manufacture.

To adjust the stone holders, the portion 11 of the body and part of portion 12 are provided with a central bore 27 within which is slidably mounted an expander member or rod 28 having a plurality of similar inclined cam surfaces 29 cooperating with complementary inclined cam surfaces 30 formed on the inner sides of the holders 15. The rod 28 has a screw threaded extension 31 at its upper end cooperating with a knurled nut 32 mounted in a counterbore 33 in body and extending beyond the end thereof so that it may be readily accessible for adjustment. The nut may be held against endwise movement by any conventional means such as a split ring 34 mounted in grooves in the nut and body as shown.

As the nut 32 is rotated, the rod 28 is moved longitudinally to increase or decrease the effective diameter of the stones 17. As the expander rod is raised, as viewed in Fig. 2, the holders will be forced outwardly and the beveled ends 18, by their engagement with the shoulders 20, will cause the holders to move downwardly slightly and further compress the spring 23. The surfaces 29 and 30 are parallel and of the same length so that the holders move in parallelism and, as the stones 17 are relatively long, the tool will hone spaced pairs of aligned bearings and insure that they will be true, round and accurate.

In use, the shank portion 14 may be gripped in the chuck of an electric hand drill which may be clamped in a vise, while the work is held in the hands. It may also be used in an ordinary drill press or in conventional reaming and honing machines.

From the foregoing description, it will be seen that the invention provides a practical tool of lasting quality which is sturdy and compact, easy to operate and relatively simple in its construction.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a honing tool of the character described, a unitary cylindrical body having a plurality of longitudinal, continuous passageways; abrasive holders mounted in said passageways; means for radially adjusting said holders including an axially mounted, one-piece expander member in said body having a screw threaded stem projecting through one end of the body; coacting means including a continuous series of stepped, inclined surfaces on said expander member and said holders to increase the effective diameter of said holders when the expander member is moved in one direction; means on the body cooperating with the ends of said holders normally biased to decrease the effective diameter of said holders; and a nut on said stem removably mounted within the body projecting axially through one end thereof and operable from outside the body connected positively to move the expander means longitudinally in either direction.

2. In a honing tool of the character described, a unitary cylindrical body having a plurality of longitudinal, continuous passageways; abrasive holders mounted in said passageways and having beveled ends; means for radially adjusting said holders including an axially mounted, one-piece expander member in said body; coacting means on said expander member and said holders to increase the effective diameter of said holders when the expander member is moved in one direction, said means including a continuous series of stepped, inclined projections on the abrasive holders and complementary projections on the expander member; a beveled undercut shoulder at one end of each passageway engaging the adjacent beveled end of a holder; a sleeve slidably mounted on the body and having an undercut beveled edge engaging the other ends of holders; a compression spring on said body engaging said sleeve; a nut threaded on the body engaging the spring to compress the same and hold the sleeve engaged with the holders; and means projecting axially through one end of the body positively to adjust the expander member longitudinally of the body in either direction.

HOWARD G. WOMMER.